United States Patent [19]
Wehner

[11] 3,866,854
[45] Feb. 18, 1975

[54] SEAT BELT LOCKING MECHANISM AND ALARM SYSTEM

[75] Inventor: William C. Wehner, Clarence Center, N.Y.

[73] Assignee: International Engineering Service, Inc., Troy, Mich.

[22] Filed: Nov. 18, 1971

[21] Appl. No.: 199,952

[52] U.S. Cl............ 242/107.4, 242/107 SB, 340/52
[51] Int. Cl......................... B65h 75/48, B60q 1/26
[58] Field of Search...... 242/107.4, 107 SB; 340/52; 280/150 SB; 297/388; 200/61.58 B; 180/82 C

[56]  References Cited
UNITED STATES PATENTS

| | | | |
|---|---|---|---|
| 3,193,327 | 7/1965 | Roe................................ | 242/107.4 |
| 3,371,736 | 3/1968 | Lewis............................. | 242/107 SB |
| 3,504,336 | 3/1970 | Boblitz........................... | 340/52 |
| 3,558,075 | 1/1971 | Stoffel............................ | 242/107.4 |
| 3,635,419 | 1/1972 | Pringle............................ | 242/107.4 |
| 3,635,420 | 1/1972 | Romanzi, Jr.................... | 242/107.4 |
| 3,667,698 | 6/1972 | Fisher............................. | 242/107.4 |
| 3,693,147 | 9/1972 | Seo................................. | 242/107.4 |

Primary Examiner—Edward J. McCarthy
Attorney, Agent, or Firm—Hauke, Gifford, Patalidis & Dumont

[57]  ABSTRACT

A seat belt drum locking means operable responsive to unwind of the belt and rotation of the drum a predetermined number of revolutions. The mechanism for locking the drum includes an operating element which activates an electrical alarm signal at the same time it is moving toward the lock initiating position. Until the belt is unwound to a length permitting a locked condition, the alarm will be continued through an electrical contact carried by the operating element. A slide is provided for adjusting the switch contact length juxtaposed to the movable electrical contact whereby the duration of the alarm is made adjustable.

11 Claims, 7 Drawing Figures

INVENTOR
WILLIAM C WEHNER

INVENTOR
WILLIAM C. WEHNER 3,866,854

SEAT BELT LOCKING MECHANISM AND ALARM SYSTEM

BACKGROUND OF THE INVENTION

I. Field of the Invention

This invention relates to locking safety belts and more specifically to a seat belt coupled to a passenger within a vehicle for the application of restraining forces. Once the belt is fastened around the body of the passenger and unwound to a degree providing a locked condition, the belt cannot further be unwound. Until this has been accomplished, however, the passenger's safety remains in jeopardy and a suitable alarm to alert him and the driver is provided.

II. Description of the Prior Art

Automatic locking mechanisms for seat belts are known in which a variety of locking means are used to retain the belt from further unwind once it has been locked around the passenger's body. At the same time, the seat belt has connected to its a yieldable biasing means which tends at all times to exert a force in the roll-up or rewind direction so as to take up the slack in the belt. The locking arrangements to inhibit the reel rotation in an unwind direction include a variety of types of inertial or centrifugally operated mechanisms which generally require an excessive number of expensive elements which are both costly to manufacture and difficult to assemble. It is the broad purpose of the present invention to provide a reliable locking arrangement for a seat belt in which an alarm signal output is provided for through an operating element for the locking means which is operated responsive to the reel or drum rotation in the unwind direction for a predetermmined number of revolutions.

SUMMARY OF THE PRESENT INVENTION

The present invention uses a seat belt similar to those of known construction with respect to the normal wind-up biasing means and with respect to the ratchet wheel and the biased locking pawl arrangement used to hold the belt in its locked position. However, there is provided a second counter biasing means which is effective until the belt has been unwound a predetermined distance to hold the pawl out of locking arrangement with the ratchet in such manner as to permit free adjustment of the belt around the passenger's body. A control element is operatively connected between the belt drum and the operating element controlling the counterbiasing force applied to the drum pawl. Responsive to a predetermined number of rotations of the drum during unwind, the control element is removed from its counterbiasing position to permit the pawl to engage in its locked position relative to the ratchet wheel thus restraining the belt from further unwind.

The present invention further relates to and includes an system which provides an audible or visual alarm signal which is initiated with belt unwind for example by the turning of the vehicle ignition switch or the actuation of a seat switch under the weight of a passenger's body. The alarm will continue until unwind is carried out to a predetermined degree. The alarm is further actuated by the movement of the operating element across an electrical switch contact element the length of which may be preset manually. The value of such an arrangement will be seen to reside in the fact that the alarm duration may be preset.

One advantage of the present invention will be seen with respect to the simplicity and compactness of the parts, particularly the motion transmitting mechanism between the belt drum and the operating element.

An additional object of the present invention will be seen to be the provision of an alarm signal which is actuated by, for example, engine turn-on which alarm signal continues until the seat belt of the driver or passengers is advanced to a substantially unwound position.

DESCRIPTION OF THE DRAWINGS

The present invention will be understood by reference to the accompanying specification and drawings in which.

DESCRIPTION OF THE PREFERRED EMBODIMENT

Figure 1:
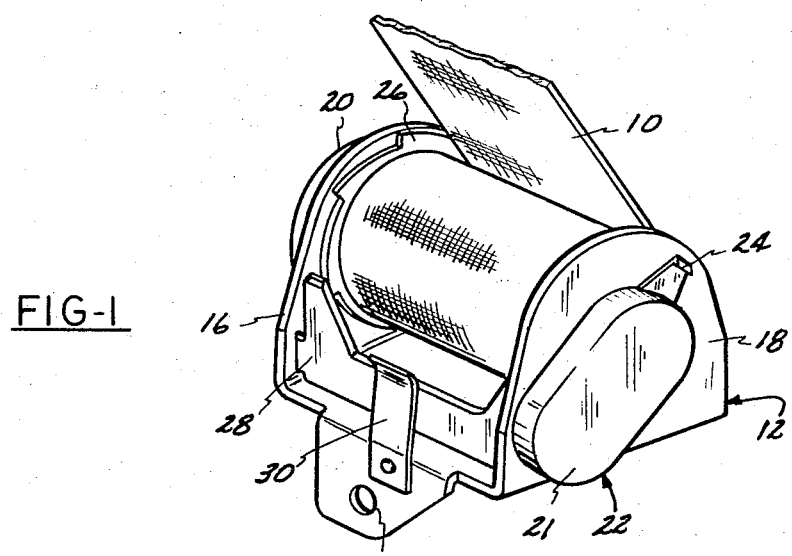
FIG. 1 is a perspective view of a seat belt mechanism incorporating the present invention.

Now referring to the drawings, FIG. 1 illustrates a seat belt 10 and a mounting bracket 12 which bracket is normally fastened to the vehicle frame at one side of the passenger seat through one or more bolt holes 14. The bracket 12 further includes a pair of outstanding side frames 16 and 18 which hold a drum or reel for the belt 10 journalled therebetween for rotation. At the left side of the frame 16 is a spring wind-up biasing means 20, such as a torsion spring, normally fixed to one end of the drum for the belt 10 and adapted to provide a yieldable tension in the wind-up direction that tends to rewind the belt 10. Mounted on the other side of frame 18 is the particular locking mechanism and alarm system incorporated by the present invention and indicated generally by the numeral 22. The locking mechanism and alarm are enclosed by a cover plate 21 which is preferably hermetically sealed. Extending from the upward end of the cover plate 21 there is a slide 24 which is longitudinally adjustable for the purpose of controlling the alarm signal duration as will be explained hereinafter more fully in connection with FIGS. 2–4.

Also shown in FIG. 1 is one side of the ratchet wheel 26 which is likewise connected to the belt drum. A pivotable double ended pawl 28 is shown, which pawl is normally biased clockwise in the locking direction through a leaf spring 30.

Figure 2:
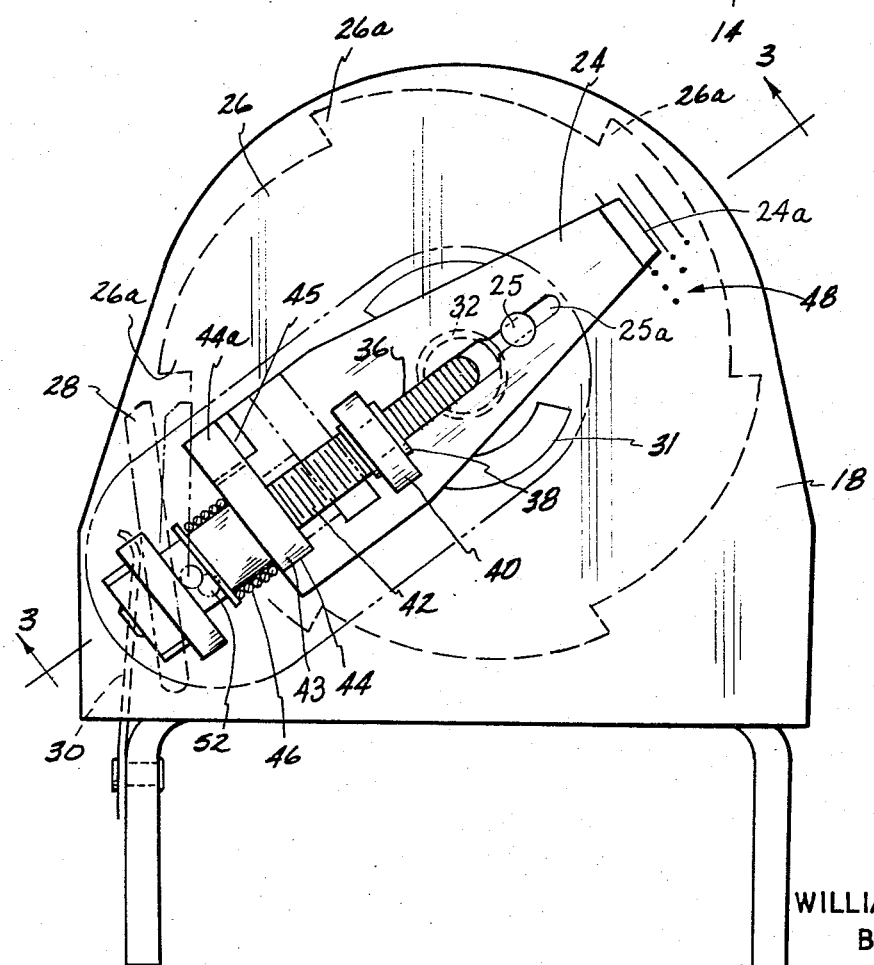
FIG. 2 is a right side elevation of the seat belt device with cover removed and showing the construction of the basic seat belt operating mechanism and the adjusting means for the alarm signal duration.
Figure 3:
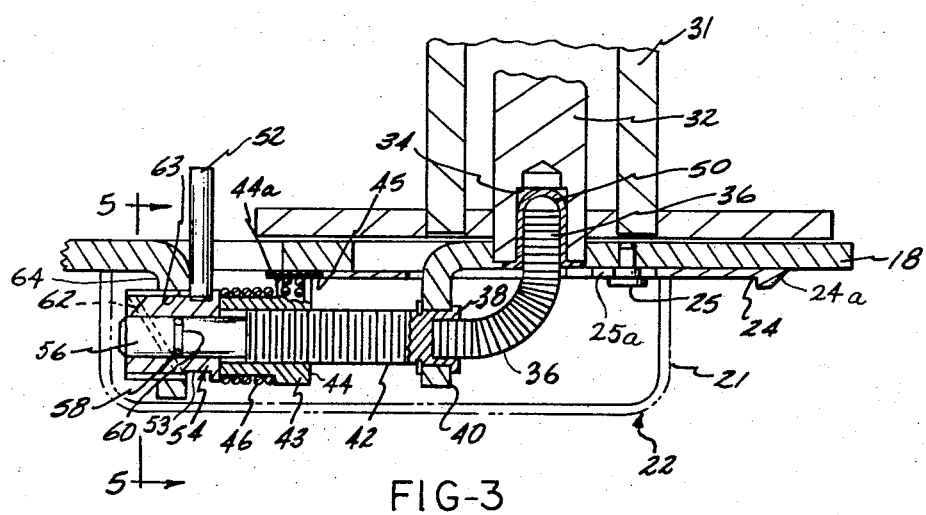
FIG. 3 is a top plan view, partly in section, showing the detail of construction of the common operating means for the belt locking mechanism and for the electrical alarm system.
Figure 7:
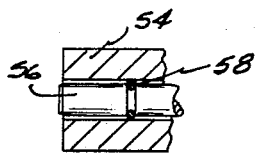
FIG. 7 is a fragmentary view to enlarged scale showing a portion of the FIG. 4 mechanism.

FIG. 2 shows the detail of the mechanism for receiving and converting the rotation of the belt drum, shown at 31, to a longitudinal movement of an operating element which controls a second biasing means pin 52, which pin normally applies a force in opposition to the biasing force applied by the leaf spring 30 for maintaining the locking pawl 28 away from its locked position for a time interval sufficient to provide a predetermined unwind of the belt 10 from its drum 31. The drum 31 for the belt 10, as best shown in FIG. 3, includes a central drum shaft 32 having at one end an axial opening 34 for retaining one end of a flexible drive 36. The flexible drive 36 is connected at its other end to a rotatable bushing 38 which is journalled for rotation in a downwardly extending lug 40. The bushing 38 has attached to it a threaded shaft 42 so that the rotation of the drum shaft 32 is communicated through the intermediate mechanism including drive 36 which provides a flexible coupling to the threaded shaft 42. The flexible drive 36 is used to achieve the connection above described although it might likewise be made through a bevel gear connection or similar type devices. The advantage of the flexible drive 36 motion transmitting arrangement is that it is bendable over as much as 90° so that the overall size of the mechanism may be reduced. The arrangement thus provided is also without backlash.

Mounted on the threaded portion of the shaft 42 is a nut 44. A coil spring 46 is assembled in the manner shown to provide a rightward biasing force against the nut 44. The nut 44 will further be seen to have an upper and right-hand enlarged end portion 43 which contains a movable and spring biased switch contact 44a for completing a circuit through its abutment with a stationary contact 45 disposed in a portion of the slide 24, the remaining of the slide 24 being made of electrically non-conductive material. It will be noted that the length of the contact 45 placed in opposition to the contact 44a depends upon the longitudinal position of the adjusting slide 24, which slide is movable to determine the duration of the alarm signal. The slide 24 thus supporting the contact 45, there is provided a closed circuit for operating an alarm device during a selected portion of the travel of the nut 44 along the threaded shaft 42. The slide 24 is held in place on the side frame 18 by means of a screw or rivet 25 passed through a longitudinal slot 25a disposed in the slide. When the vehicle ignition is turned on or a passenger is seated according to the selected switching, the circuit is completed in such a way as to provide activation of a visual warning through a blinker light or an audible signal such as a buzzer. The alarm signal will continue to be emitted until the belt 10 has been unrolled to a position sufficient to permit locking engagement about the passenger's body. It will be seen that there is provided a set of indicia 48, FIG. 2, in alignment with the upper end 24a of the slide 24 with the duration of the preset signal indicated. For example, when the slide 24 is manually pulled upwardly and rightwardly to its upper position, an alarm signal of maximum duration will be provided. Alternately if the upper end of the slide 24 is set to the three dot level of the indicia 48, an alarm output signal of minimum duration will be provided.

Figure 4:
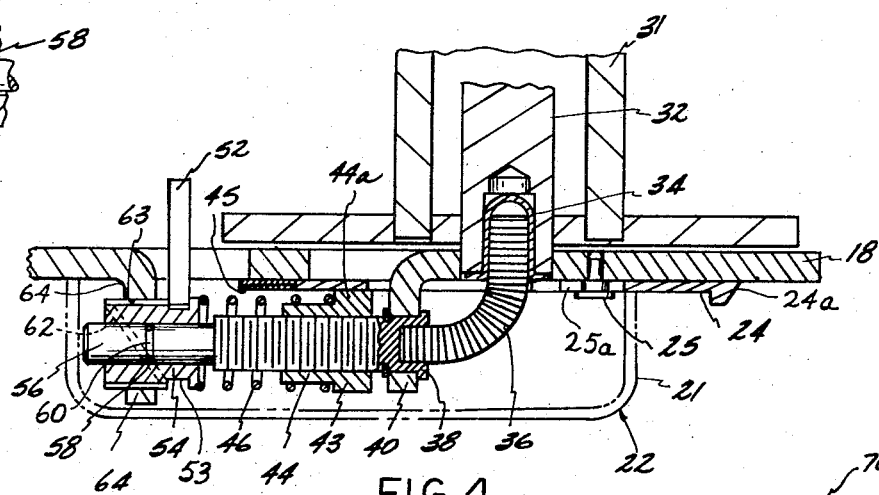
FIG. 4 is a view substantially similar to FIG. 3 but showing the belt locking mechanism in its final actuated position.
Figure 5:
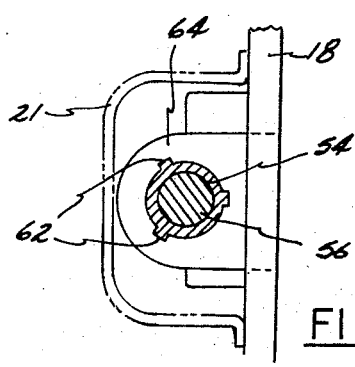
FIG. 5 is a section taken along the line 5—5 of FIG. 3 but turned through 90°.

The mode of operation of the device is best shown by the drawings of FIGS. 3, 4 and 5. In FIG. 3 it will be seen that the right-hand end of the flexible drive 36 is press fitted into a cap 50, which cap is forced into the axial opening 34 at the end of the drum shaft 32. In the drawing of FIG. 3, the parts are shown in their actuating or intermediate position. The actual counterbalancing force to the force applied by the leaf spring 30 is provided through a pin 52 which, as may be seen from the hidden line representation of FIG. 2, controls the operation of the locking pawl 28. For better holding action, a ratchet wheel 26 having a plurality of teeth 26a is normally attached at both sides of the belt drum 31. Responsive to the unwind of the belt 10, the shaft 32 will be rotated along with the flexible drive 36 and the attached bushing 38. This will rotate the threaded shaft 42, which rotation in turn will cause a rightward movement of the nut 44 along the threads of the shaft 42.

Also shown in FIGS. 2 and 3 is the means used to move the locking pin 52 from its counterbiasing position with respect to the leaf spring 30. As was earlier shown in FIG. 2, the pin 52 is movable from its counterbiasing position shown in the left-hand dash line configuration to the locking position shown at the right in phantom. In FIG. 3, it will be seen that the pin 52 has its lower end projecting into a groove 53 in a bushing 54 and its upper end is connected by welding or soldering to the pawl 28. The bushing 54 holds in its internal diameter a drive plug 56. The drive plug 56 has an O-ring 58 mounted in a peripheral groove 60. The bushing 54 further has formed on its outer surface three helical teeth 62 which are raised and in engagement with a relatively loosely fitting journal opening 63 formed in a projecting support frame 64. It will accordingly be seen that the drive plug 56 provides a yieldable drive through the O-ring 58 against the inner surface of the bushing 54. As the nut 44 is advanced on the threaded shaft 42, the spring force exerted by spring 46 against the right-hand end of the bushing 54 is relieved. The drive through the O-ring 58 then becomes effective to cause a rightward movement of the bushing 54 through the coaction of its external spline teeth 62 with the inner diameter of the opening 63 through the support 64. In this manner, the device operates as a frictional clutch. Since the pin 52 is mounted on the bushing 54, it will be moved rightwardly with the bushing 54. As best shown in FIG. 2, the counterbiasing force exerted by the pin 52 against the pawl 28 will be relieved to permit the pawl 28 to be pivoted by the force of the spring 30 into a locking engagement with the opposed tooth 26a of the ratchet wheel 26. Thus, it will be seen that the belt has been locked in the proper position.

Figure 6:
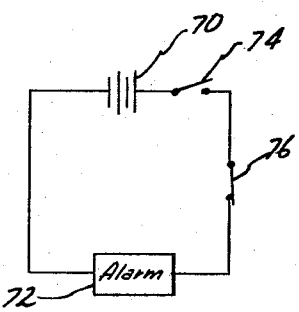
FIG. 6 is a schematic drawing of the alarm system.

FIG. 6 shows the alarm system as it operates in conjunction with the seat belt locking mechanism already described. The alarm system provides a visual or audible alarm until the belt 10 has been unwound a substantial amount from the drum 31. The circuit includes a source of DC potential 70 and an electrical alarm device indicated by the numeral 72. The alarm device 72 may be a blinking or a colored light in the event of a visual signal or it may be a buzzer in the event an audible signal is desired. At least two switches are used in the circuit. A normally open switch 74 is used to initiate the alarm signal and it may be closed by way of example from the vehicle ignition switch or from a blade switch operated in an occupied passenger's seat. A second and normally closed switch 76 is operated during the unwind of the seat belt 10 as has been previously indicated in the description of operation of its movable contact 44a and the stationary contact, which comprises the uninsulated portion of the slide 24. The electrical signal from the alarm device 72 is thus held on until there is provided a predetermined unwind of the belt 10 with the unwind being measured in terms of the number of revolutions of the drum 32 as further translated into the linear movement of the nut 44 carrying the switch contact 44a.

It will thus be seen that with the present invention there has been provided a seat belt locking mechanism and associated alarm system which both operate from a common operating mechanism in a novel manner.

What is claimed is:

1. An alarm system for a vehicle passenger seat belt comprising a drum, a belt engageable and lockable about a passenger, said belt having one end attached to and wound on said drum, locking means for preventing rotation of said drum after rotation of said drum a predetermined number of revolutions during belt unwind, said alarm system comprising an electrical alarm device and switching means for activating said alarm device, said switching means comprising a stationary switch contact, a movable switch contact and a switch operating means, said operating means comprising a member displaceable by rotation of said drum and supporting said movable contact for holding said movable contact in engagement with said stationary contact to activate said alarm device until a predetermined number of revolutions of said drum have occurred, wherein said stationary contact is mounted on an insulating plate, said plate being adjustable manually in the direction of travel of said movable contact to position said stationary contact relatively to said movable contact to preset the duration of activation of said alarm device during belt unwind, and wherein said member displaceable by rotation of said drum is a nut member threaded on a threaded shaft driven in unison with said drum, said switch operating means further comprising means preventing said nut member from rotating such that rotation of said shaft causes longitudinal displacement of said nut member, said movable switch contact being mounted on said nut member.

2. A seat belt locking mechanism comprising a frame, a first shaft rotatably mounted on said frame, a drum attached to said shaft for rotation therewith, a belt attached to said drum for winding thereon and unwinding therefrom, a ratchet wheel mounted on said first shaft for rotation therewith, a pawl pivotally mounted on said frame for engagement with said ratchet wheel, biasing means for urging said pawl into engagement with said ratchet wheel, a second shaft rotatably supported by said frame and having a threaded body portion and an unthreaded end portion, drive means for rotating said second shaft in unison with said first shaft, a bushing disposed about the unthreaded portion of said second shaft, friction drive means between said bushing and said unthreaded portion of the second shaft, a projecting abutment member dependent from said pawl to pivot said pawl away from engagement with said ratchet wheel, said abutment member being operable to cause engagement and disengagement of said pawl with said ratchet wheel as a result of longitudinal displacement of said bushing along the unthreaded portion of said second shaft, helicoidal spline connecting means between said bushing and said frame, a nut member threaded on the threaded portion of said second shaft, means preventing rotation of said nut member such that rotation of said second shaft cause said nut member to be longitudinally displaced, a coil spring disposed about said shaft and having an end engaging said nut member and the other end engaging said bushing such that when said spring is compressed as a result of said nut being disposed proximate said bushing said bushing is displaced longitudinally to a position whereby said abutment member disengages said pawl from said ratchet wheel and when said nut is displaced away from said bushing said frictional drive between the unthreaded portion of said second shaft and said bushing causes said bushing to rotate in unison with said shaft such as to be longitudinally displaced under the action of said spline connecting means between said bushing and said frame, thereby displacing said abutment member to cause disengagement of said pawl from said ratchet wheel.

3. The seat belt locking mechanism of claim 2 wherein said drive means between said first shaft and said second shaft is a right angle drive, and said second shaft is disposed at an axis substantially perpendicular to the axis of said first shaft.

4. The seat belt locking mechanism of claim 3 wherein said right angle drive is a flexible drive.

5. The seat belt locking mechanism of claim 2 wherein said frictional drive comprises a resilient O-ring disposed in a peripheral groove on the unthreaded portion of said second shaft and yieldably engaging the internal bore of said bushing.

6. The seat belt locking mechanism of claim 2 wherein an electrically conductive switch contact is supported on said nut member for engagement with an elongated stationary switch contact dependent from said frame, and electrical circuit operable when said contacts are in engagement to give an alarm indicating that said belt is wound on the drum.

7. The seat belt locking mechanism of claim 6 wherein said elongated stationary contact is disposed in an insulated slide member manually adjustable longitudinally to preset the duration of said alarm as a function of the length of said belt remaining wound on said drum.

8. The alarm system of claim 6 further comprising a second switch in series in said circuit, said second switch being closed upon turning on the ignition of said vehicle.

9. The alarm system of claim 6 further comprising a second switch in series in said circuit, said second switch being normally open and closed upon a person sitting on the seat of said vehicle.

10. The alarm system of claim 1 further comprising second switching means in series with said first mentioned switching means, said second switching means being closed upon turning on the ignition of said vehicle.

11. The alarm system of claim 1 further comprising second switching means in series with said first mentioned switching means, said second switching means being normally open and closed upon a person sitting upon the seat of said vehicle.

* * * * *